Oct. 14, 1941.    H. L. MATSINGER    2,258,993
SOUND RECORDING APPARATUS
Filed July 31, 1940
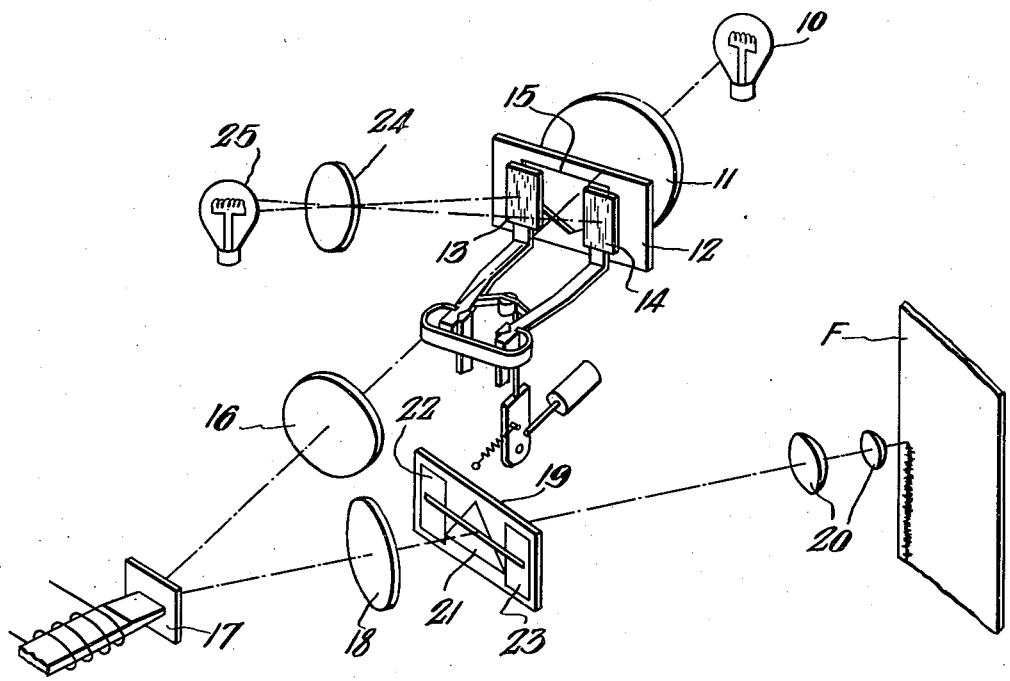
Inventor
*Harry L. Matsinger*
By
Attorney Patented Oct. 14, 1941

2,258,993

UNITED STATES PATENT OFFICE 2,258,993

SOUND RECORDING APPARATUS

Harry L. Matsinger, Philadelphia, Pa., assignor to Radio Corporation of America, a corporation of Delaware Application July 31, 1940, Serial No. 348,891

3 Claims. (Cl. 179—100.3)

This invention relates to sound recording apparatus and more particularly to an improved apparatus and method for the photographic recording of sound on film.

In the photographic recording of sound on film there have been heretofore proposed a number of devices for masking off a portion of the sound track on the negative so that those portions of the sound track will be printed black on the positive thereby producing a reduction in the ground noise from the film. Such ground noise as is now well known in the art is produced by transmission of light through portions of the film not used in the sound wave images.

One type of shutter mechanism for masking off the unused portion of the sound track area is shown in Baker et al. Patent No. 2,102,777, in which a double shutter arrangement masks off both edges of the sound track. It has also been proposed, as for example in McDowell Reissue Patent No. 21,389 to use a plurality of galvanometers one of which records the sound wave images and the other of which records the envelope of those images. Such an arrangement produces a positive record, i. e., one which is adapted to be played back directly in the sound reproducer, instead of a negative but a sound record produced in that manner is of the asymmetric or singly modulated type and is subject to distortion under certain conditions of operation.

The present invention pertains to apparatus for the production of a direct positive sound track of the symmetrical or doubly modulated type, such as described and claimed, for example, in Dimmick Patent 1,999,721, but with the ground noise reduction recording applied to both edges of the sound track.

This result is accomplished by the shutters as in the above mentioned Baker et al. patent, but which shutters instead of merely obscuring light from the recording source are made light reflective and direct light from an auxiliary source onto the film so as to produce the appropriate black margins.

One object of the invention is to provide an improved sound recording apparatus.

Another object is to provide an improved apparatus for making direct positive sound records.

Another object of the invention is to provide an improved mechanism for obscuring the unused margins in a sound record.

Another object of the invention is to provide an improved apparatus for producing an image of the envelope of the sound record.

Other and incidental objects of the invention will be apparent to those skilled in the art from a reading of the following specification and an inspection of the accompanying drawing in which the single figure is a perspective schematic illustration of the arrangement of parts of an improved optical system.

The drawing illustrates a commercial type of variable area sound recording optical system as modified in accordance with the present invention. Light from the usual exciter lamp 10 is directed by the condenser lens 11 through the aperture plate 12 to the lens 16. The lenses 11 and 16 together preferably image the filament of the lamp 10 on the galvanometer mirror 17 from which the light is reflected to the slit plate 19 through the lens 18. Light passing through the slit in the plate 19 is focused on the film F by the objective 20. The aperture 15 in the plate 12 is provided with two sides which meet at an angle and which accordingly form an image 21 on the slit plate 19 which varies in width along the slit in the plate 19 as it is moved up and down by the galvanometer 17.

Shutter blades 13 and 14 are provided immediately adjacent the aperture plate 12 as described in the Baker et al. patent above referred to, but these shutter blades are provided with a light reflecting surface. The surface of the blades may be polished and plated with an appropriate light reflecting material, such as silver or nickel, or the blades may be merely provided with a white coating to give diffuse reflection. Light from the source 25 is directed by a condenser lens 24 upon the shutter blades 13 and 14 and the blades are accordingly imaged as bright spots 22 and 23 on the slit plate 19. Light from the images 22 and 23 passes through the slit in the plate 19 and produces darkened marginal images on the film F. The operation of the blades 13 and 14 is controlled by the usual ground noise reduction amplifier as in the aforesaid Dimmick and Baker et al. patents.

It will be apparent from the foregoing description that the record produced on the film F will be in the form of a symmetrical blackened sound track with marginal blackened images corresponding to the envelope of the sound waves and the record will therefore be a positive, i. e., a record adapted to be directly played in the sound reproducer. From this record prints may be made which are, from the sound reproduction standpoint, negatives in that they permit maximum light transmission even though from a strictly photographic standpoint they might be considered positive prints and from these indirect negatives further positive prints may be produced as desired.

Having now described my invention, I claim:

1. In a sound-recording device including an illuminated aperture, a slit and means for vibrating an image of said aperture across said slit in accordance with sound waves to be recorded, the combination of light-reflecting means movable across said aperture in accordance with the envelope of said sound waves, and means for illuminating said light-reflecting means.

2. In a sound-recording device including an illuminated aperture, a slit and means for vibrating an image of said aperture in one direction across said slit in accordance with sound waves to be recorded, the combination of light-reflecting means movable in another direction across said aperture in accordance with the envelope of said sound waves, and means for illuminating said light-reflecting means.

3. A sound-recording device including an illuminated aperture, a light slit means for vibrating an image of said aperture transversely of said slit in accordance with sound waves to be recorded, light-reflecting means movable longitudinally of said aperture in accordance with the envelope of said sound waves, and means for illuminating said light-reflecting means.

HARRY L. MATSINGER.